G. A. H. KELLNER.
PROJECTING LAMP.
APPLICATION FILED AUG. 2, 1907.
969,785.
Patented Sept. 13, 1910.
3 SHEETS—SHEET 1.
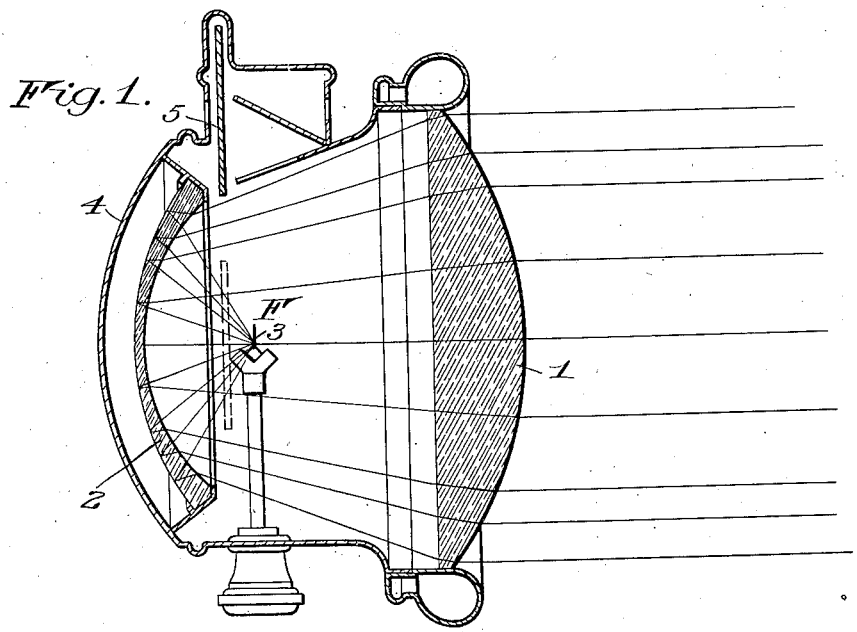
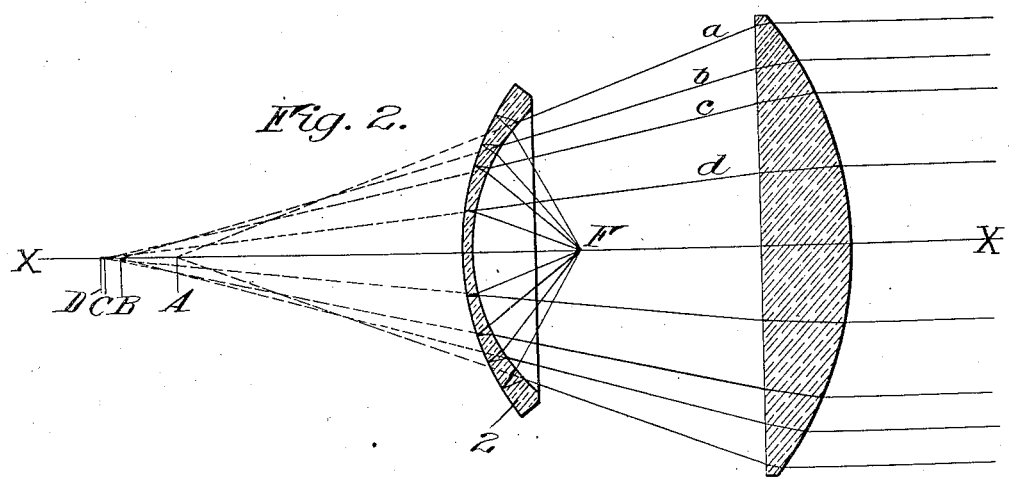

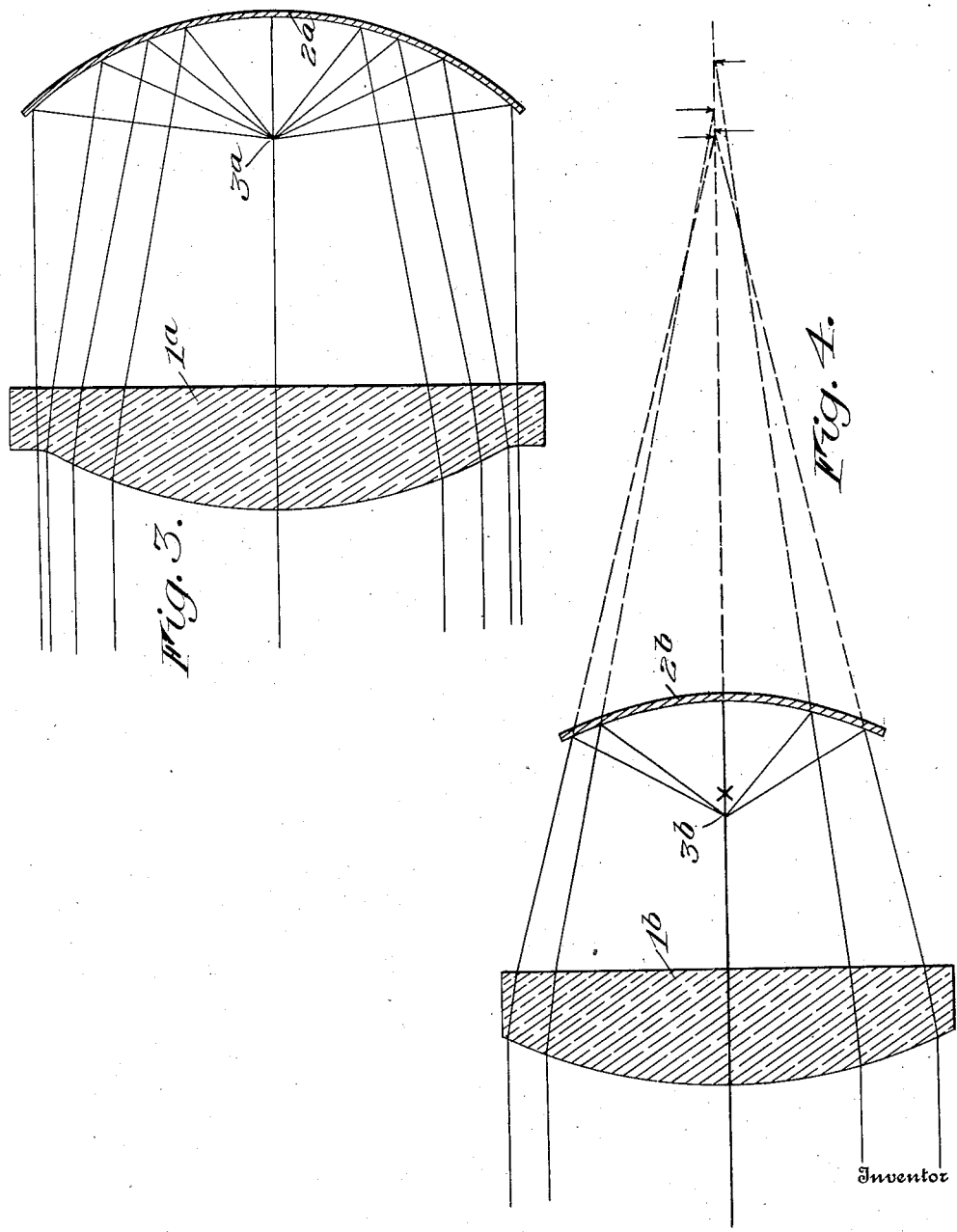

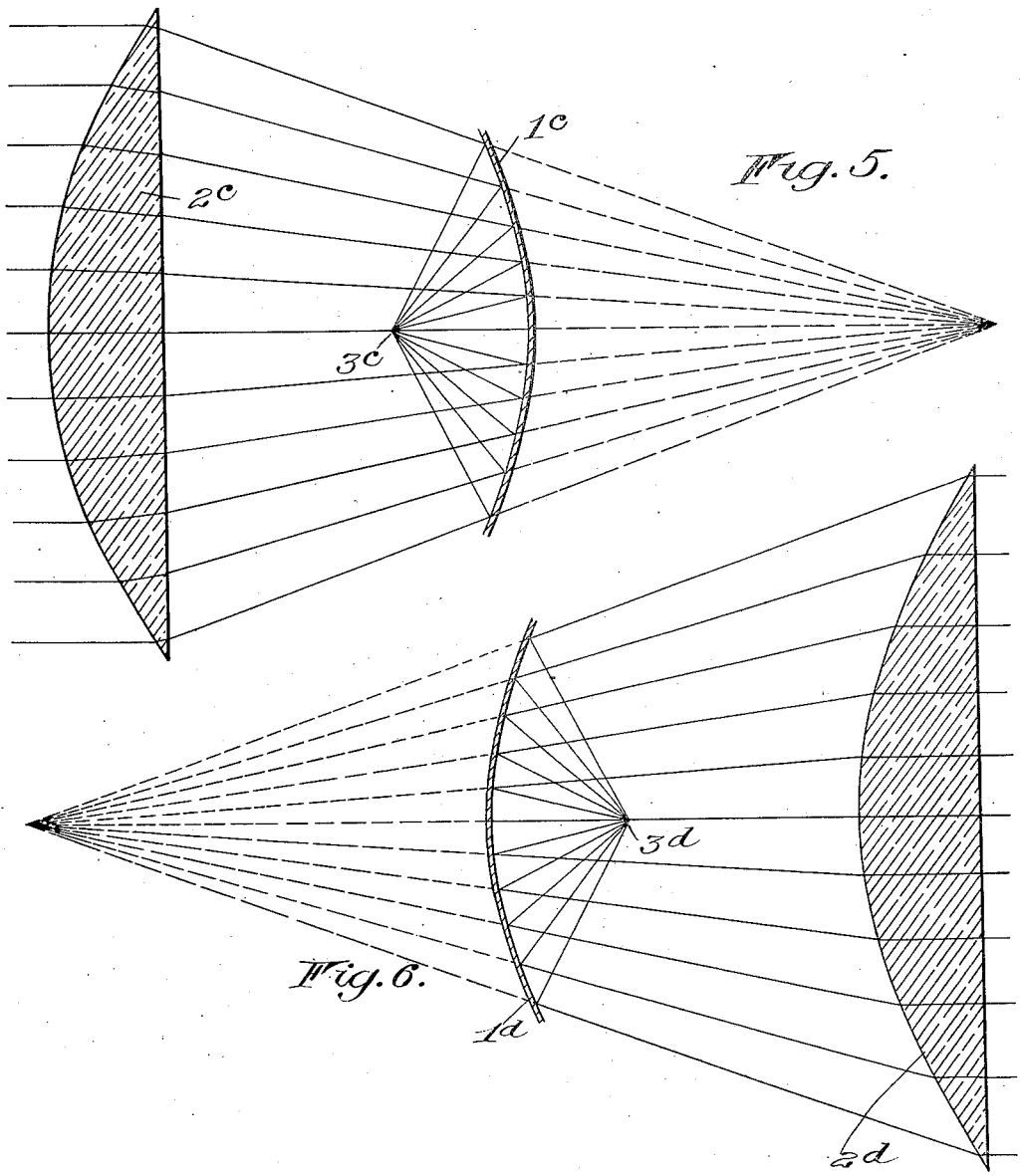

UNITED STATES PATENT OFFICE.

GUSTAV A. HERMANN KELLNER, OF ROCHESTER, NEW YORK, ASSIGNOR, BY MESNE ASSIGNMENTS, TO BAUSCH & LOMB OPTICAL COMPANY, A CORPORATION OF NEW YORK, (No. 2.)

PROJECTING-LAMP.

969,785.  Specification of Letters Patent.  Patented Sept. 13, 1910.

Application filed August 2, 1907. Serial No. 386,694.

*To all whom it may concern:*

Be it known that I, GUSTAV A. HERMANN KELLNER, of Rochester, in the county of Monroe and State of New York, have invented certain new and useful Improvements in Projecting-Lamps; and I do hereby declare the following to be a full, clear, and exact description of the same, reference being had to the accompanying drawings, forming a part of the specification, and to the reference-numerals marked thereon.

The present invention relates to projecting lamps of the type employing a lens and a reflector with a source of light arranged between them in such a manner that two pencils of rays are formed, one, the reflected and refracted rays, producing a powerful illumination at a great distance, and the other, the directly refracted rays, spreading illumination near the lamp only. A great objection to lamps of this type has been that, owing to the spherical aberration of the lens or the reflector, or both, the reflected rays do not issue from the lens as a homogeneous beam, or in other words, parallel to the optical axis of the lamp, and, as a consequence, a sufficiently powerful illumination at a distance is not secured.

This invention has for an object to provide a lamp in which the lens and the reflector are so formed and so arranged relatively to the light source that the reflected rays issue from the lens parallel to the optical axis and thereby produce a condensed and powerful beam.

To these and other ends the invention consists in certain improvements and combinations of parts all as will be hereinafter more fully described, the novel features being pointed out in the claims at the end of the specification.

In the drawings: Figure 1 is a lamp constructed in accordance with my invention, in which the reflector acts to correct the spherical aberration of the lens. Fig. 2 is a diagrammatic view of the optical elements of the same lamp. Fig. 3 is a view of the optical parts of a lamp in which a lens with spherical aberration corrects a reflector. Fig. 4 is a like view of lamp parts in which a reflector normally without spherical aberration corrects the lens. Fig. 5 is a like view in which both the lens and the reflector are without spherical aberration, and Fig. 6 is a like view in which a reflector without spherical aberration is combined with a lens without spherical aberration, arranged with its convex face disposed toward the reflector.

In the present invention a beam of parallel rays is secured by having the axial and the marginal rays of the lens focus at the focal point of the optical combination and by locating the source of light at this point. This optical relation of the parts may be obtained in various ways, for instance, in the embodiment shown in Figs. 1 and 2 there is provided a condensing lens 1 spherically under-corrected that is, one which, if it is to project parallel rays, must receive its light from a focal point which is nearer to the lens as the ray approaches the margin of the latter; for example, in the lens shown the light must emanate from the point A on the optical axis X to produce the marginal ray $a$, from the point B for the ray $b$, from the point C for the ray $c$, from the point D for the ray $d$ and so on. I combine with this lens 2 a spherically overcorrected reflector preferably in the form of a lens mirror, that is, a mirror having two faces curved about different centers. This lens mirror has a spherical aberration of opposite sign to that of the lens and preferably of like amount, so as to have a correcting effect on the latter, or in other words, so as to focus the marginal, axial and other rays from the lens 1 at the point F or the focal point of the optical combination, or from still another point of view, to reflect images of a light source 3 arranged at the focal point F at distances from the optical axis X corresponding to the spherical aberration of the lens, and in this manner cause the lamp to project parallel rays. As an example of a construction made in accordance with this form of my invention, I may combine with a lens, which is arranged at 91.8 mm. from the focal point F and has a diameter of 220 mm., a radius of 187.2 mm. and a thickness of 42 mm., a lens reflector arranged 55 mm. from the focal point F and having an inner radius of 96 mm., an outer radius of 136.5 mm. and a thickness of 4 mm. at the optical axis.

Instead of having the reflector exercise a correcting effect on the lens, the latter may be able to exercise a correcting effect on the reflector as shown in Fig. 3. In this form I employ a spherical mirror or reflector $2^a$ which, as is well known, is spherically under-corrected and combine therewith a lens $1^a$, which is spherically over-corrected, in other words, the lens and the reflector have spherical aberrations of opposite signs and preferably like amount so that the marginal rays of the lens focus at the focal point of the optical combination, as in the embodiment shown in Figs. 1 and 2. The light source $3^a$ is also arranged at this focal point. A plano-convex lens for this embodiment of my invention is constructed by means of the following equation for its curve:

$$F_1(x, y, z, \varphi) = 0 = (\mu^2 - 1)x^2 + 2x \left\{ -\mu^2 k + \mu k + t + m - \frac{t-z}{\cos \varphi} \right.$$

$$\left. - \sqrt{m^2 - 2m\,z + 2z} \right\} + \mu^2 y^2 - 2\mu^2 y \left\{ \sqrt{2z - z^2} + (t-z) \tan \varphi \right\}$$

$$- \left\{ \frac{t-z}{\cos \varphi} + \sqrt{m^2 - 2m\,z + 2z} - \mu k - i - m \right\}^2 + \mu^2 k^2$$

$$+ \mu^2 (\sqrt{2z - z^2} + (t-z) \tan \varphi)^2$$

$$F_2(x, y, z, \varphi) = 0 = (k - x) \tan \varphi^1 + (t - z) \tan \varphi + \sqrt{2z - z^2} - y$$

$$F_3(z, \varphi) = 0 = -\tan \varphi + \frac{[z^2(8m - 4 - 4m^2) + z(2m^3 + 2m^2 - 6m + 2) - 2m^3 + m^2] \sqrt{2z - z^2}}{z^3(8m - 4 - 4m^2) + z^2(2m^3 + 6m^2 - 14m + 6) + z(-4m^3 + m^2 + 2m) + m^3}$$

$$F_4(\varphi, \varphi^1) = 0 = \sin \varphi - \mu \sin \varphi^1$$

In this equation:
$a$ = index of refraction
$r$ = radius of mirror = 1
$m$ = distance of light source from mirror
$t$ = distance between plano face of lens and vertex of mirror
$k$ = thickness of lens
$\left. \begin{array}{c} x \\ y \end{array} \right\}$ = coördinates of point on curve
$z$ = projection on optical axis of section of mirror between vertex and point where ray strikes,
$\varphi$ = angle under which ray strikes plano face
$\varphi_1$ = angle of refraction in glass.

The invention is also embodied in the construction shown in Fig. 4, wherein I employ an over-corrected condensing lens $1^b$, a hyperbolic reflector $2^b$ and a light source $3^b$. As is well known, if a light source be located at the geometrical focus of a hyperbolic reflector it will be imaged free from spherical aberration at the other geometrical focus of the hyperbola, but if the light source be located away from this point the rays will appear as if thrown by a reflector with spherical aberration. I utilize this latter fact in correcting the spherical aberration of the lens $1^b$ and to this end I mount the light source away from the focal point of the hyperbolic reflector $2^b$, so as to produce a spherical aberration of opposite sign to that of the lens. As an example of a construction in accordance with this embodiment of my invention I employ a hyperbolic reflector in which the equation of its curve is $$\frac{x^2}{4225} - \frac{y^2}{10175} = 1.$$

The geometrical focus of this reflector will be 55 mm. from its center. The lens combined with the reflector should have a radius of 280.794 mm. and a thickness of 63 mm. and its plano face should be arranged 147.512 mm. from the center of the deflector. If now the light source be located on the optical axis at 64 mm. from the vertex of the reflector, the latter will exercise a correcting effect on the lens, and rays substantially parallel to the optical axis of the lamp will be projected by reason of the axial and the marginal rays of the lens focusing at the focal point of the combination. By this arrangement exactly parallel rays are not projected but the angles of the rays with relation to the optical axis are so small that a very condensed beam is produced. For instance, with the construction above described, a ray striking the reflector at an angle of 40 degrees, 8′ to the optical axis will issue from the lens at an angle of 11.77′ to the optical axis crossing the latter in advance of the lens, whereas rays striking the reflector at angles of 52° 41′, 58° 44′ and 6° 25′, will issue from the lens at angles of 1.32′; 6.76′ and 1.84′ respectively, to the optical axis, crossing the latter in the rear of the lens.

My invention is further embodied in the construction shown in Fig. 5 in which $1^c$ indicates a reflector, such as a hyperbolic reflector which is free from spherical aberration and which is used in combination with a lens $2^c$ also free from spherical aberration, thus producing a beam in which the rays are parallel to the optical axis of the lamp. The equation of the hyperbola, referring to its center as the origin, is $$\frac{x^2}{a^2}+\frac{y^2}{b^2}=1$$

where $\sqrt{a^2+b^2}-a=$ distance of flame from vertex $\sqrt{a^2+b^2}+a=$ distance of image of flame from vertex.

The equation of the deformed surface of the lens $2^c$ referring to its vertex as the origin, is:

$$x=\frac{\cos \varphi^1}{\mu-\cos \varphi_1}\left(\frac{a}{\cos \varphi}-\mu\, k-a+\frac{\mu\, k}{\cos \varphi_1}\right)$$

$y=a\tan\varphi+(k-x)\tan\varphi^1$ $\sin\varphi=\mu\sin\varphi_1$ where $a$ is distance of focus from plano face, $K$ is thickness of lens, $\mu$ is index of refraction of lens, $\varphi$ is the angle any ray at the focus makes with optical axis.

Instead of presenting the plano face of the lens to the source of light, as shown in Fig. 5, the curved face may be turned inwardly, as shown in Fig. 6. In this embodiment the convex face of the lens $2^d$ is in the form of a hyperbola and the reflector $1^d$ is a hyperbola, as in the embodiment shown in Fig. 5, the light source $3^d$ being at the focal point of the reflector and of the combination.

In all embodiments of my invention the optical parts may be supported in any suitable manner, as for instance, by the casing 4 in Fig. 1. This casing may be provided with a shutter 5 movable to the position shown in dotted lines for the purpose of cutting off the reflected rays so that the lamp may be used only to disperse rays. The light source is preferably an acetylene gas burner, as this produces an intense light.

It will be noted from the foregoing that I have provided a lamp which will project a very condensed beam and also give strong spreading rays adjacent thereto. These results make the lamp very desirable for use on automobiles where not only must illumination far ahead be secured, but the immediate path in front of the vehicle must be clearly visible.

I claim as my invention.

1. In a projecting lamp, the combination with a light source, of a lens and a reflector, having spherical aberration of opposite signs.

2. In a projecting lamp, the combination with a light source, of a lens and a reflector having spherical aberration of like amount, but of opposite signs, and arranged so that rays will be projected parallel to the optical axis of the lamp.

3. In a projecting lamp, the combination with a light source, of a condensing lens having spherical aberration and arranged to distribute rays received directly therefrom, and a lens reflector directing rays from the light source to the condensing lens and having spherical aberration of opposite sign to that of the condensing lens.

GUSTAV A. HERMANN KELLNER.

Witnesses:
HAROLD H. SIMMS,
RUSSELL B. GRIFFITH.